US010557398B2

(12) United States Patent
Hikichi

(10) Patent No.: US 10,557,398 B2
(45) Date of Patent: Feb. 11, 2020

(54) EXHAUST PIPE STRUCTURE FOR INTERNAL COMBUSTION ENGINE

(71) Applicant: HONDA MOTOR CO., LTD., Tokyo (JP)

(72) Inventor: Kentarou Hikichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 15/578,912

(22) PCT Filed: Jun. 4, 2015

(86) PCT No.: PCT/JP2015/066216
§ 371 (c)(1),
(2) Date: Dec. 1, 2017

(87) PCT Pub. No.: WO2016/194201
PCT Pub. Date: Dec. 8, 2016

(65) Prior Publication Data
US 2018/0149066 A1 May 31, 2018

(51) Int. Cl.
F01N 13/08 (2010.01)
F01N 13/00 (2010.01)
(Continued)

(52) U.S. Cl.
CPC ............ F01N 13/08 (2013.01); F01N 3/021 (2013.01); F01N 3/10 (2013.01); F01N 3/206 (2013.01);
(Continued)

(58) Field of Classification Search
CPC ...... F01N 3/2892; F01N 13/008; F01N 13/10; F01N 2340/02; F01N 2340/04
See application file for complete search history.

(56) References Cited

U.S. PATENT DOCUMENTS

2016/0076431 A1* 3/2016 Kuramashi ........... F01N 3/2892
60/299

FOREIGN PATENT DOCUMENTS

EP 1612383 A2 1/2006
JP 59-190926 U 12/1984
(Continued)

OTHER PUBLICATIONS

International Search Report dated Aug. 18, 2015, issued in counterpart International Application No. PCT/JP20115/066216 (2 pages).
(Continued)

Primary Examiner — Audrey K Bradley
(74) Attorney, Agent, or Firm — Westerman, Hattori, Daniels & Adrian, LLP

(57) ABSTRACT

The present invention discloses an exhaust pipe structure for an internal combustion engine in which a tubular exhaust purifying catalyst device including an exhaust purifying catalyst is disposed in a vicinity of the internal combustion engine within an engine room. The exhaust pipe structure comprises an exhaust pipe main part which curves from a side of the internal combustion engine and extends towards an end of the exhaust purifying catalyst device in a center axis line direction of the exhaust purifying catalyst device and an exhaust pipe introduction part that connects the exhaust pipe main part and the end of the exhaust purifying catalyst device, and introduces exhaust gas from the exhaust pipe main part into the exhaust purifying catalyst device.

2 Claims, 16 Drawing Sheets

(51) Int. Cl.
  *F01N 3/10* (2006.01)
  *F01N 3/20* (2006.01)
  *F01N 3/24* (2006.01)
  *F01N 3/28* (2006.01)
  *F01N 3/021* (2006.01)

(52) U.S. Cl.
  CPC ............ *F01N 3/24* (2013.01); *F01N 3/2892* (2013.01); *F01N 13/008* (2013.01); *F01N 13/009* (2014.06); *F01N 13/0097* (2014.06); *F01N 2340/02* (2013.01); *F01N 2340/04* (2013.01); *Y02T 10/20* (2013.01)

(56) References Cited

FOREIGN PATENT DOCUMENTS

| | | |
|---|---|---|
| JP | 2006-17018 A | 1/2006 |
| JP | 2006-299927 A | 11/2006 |
| JP | 2009-156075 A | 7/2009 |
| JP | 2014-211112 A | 11/2014 |

OTHER PUBLICATIONS

Notification of Reasons for Refusal dated Jan. 8, 2019, issued in counterpart JP Application No. 2017-521452, with English machine translation. (9 pages).

\* cited by examiner

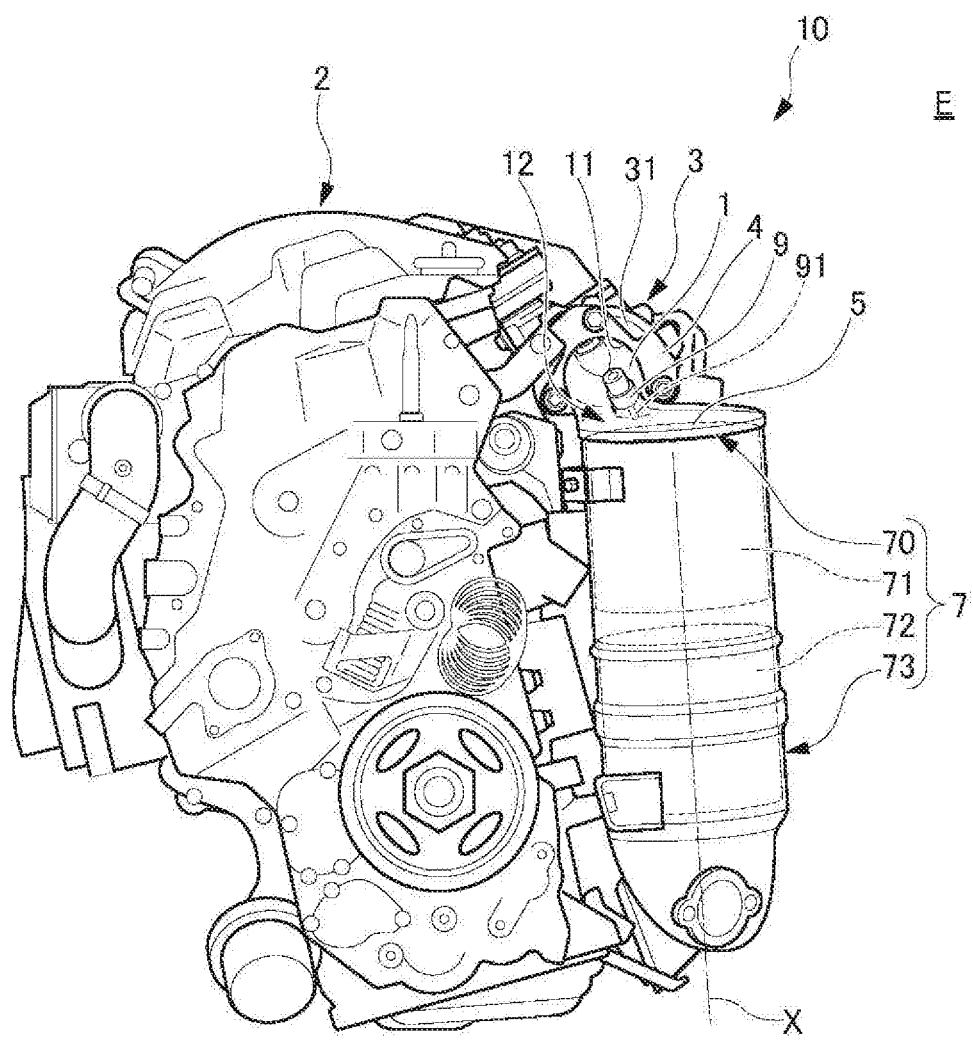
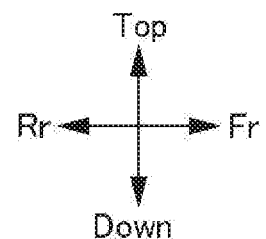
FIG. 2

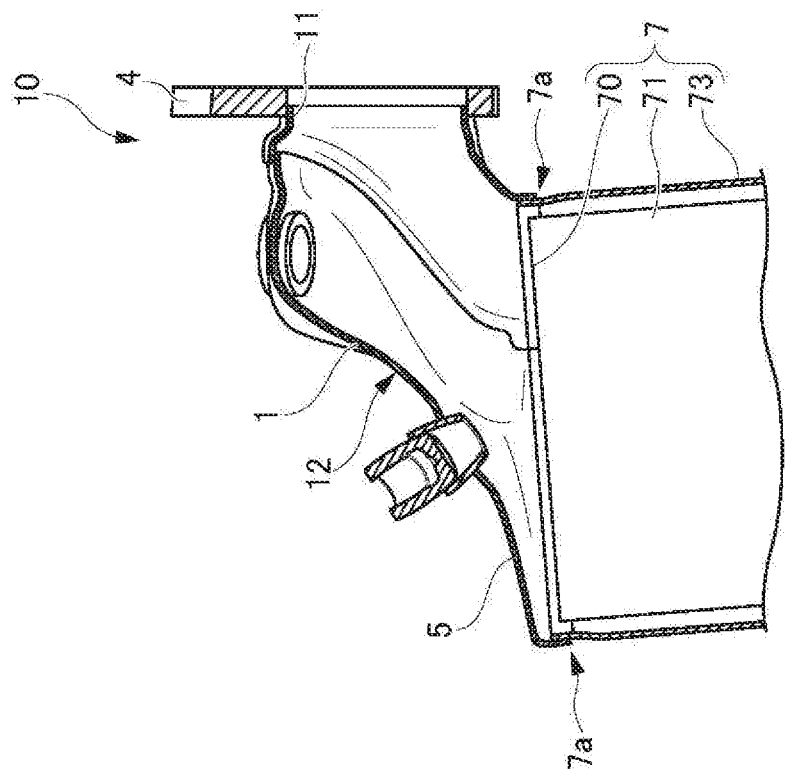
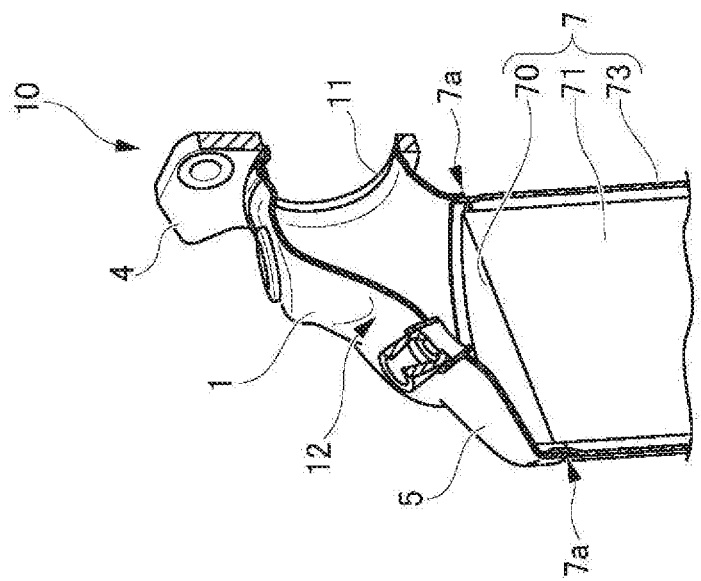
FIG. 6

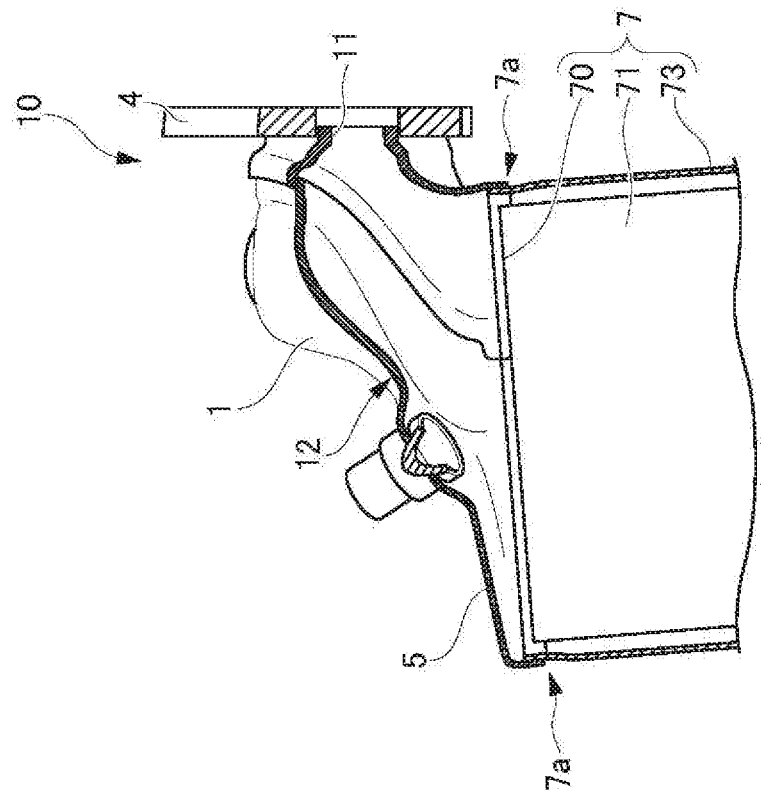
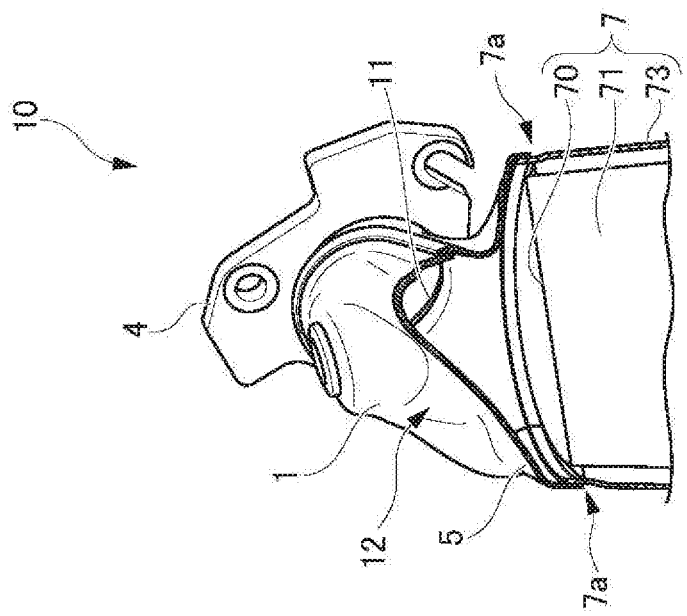
FIG. 7

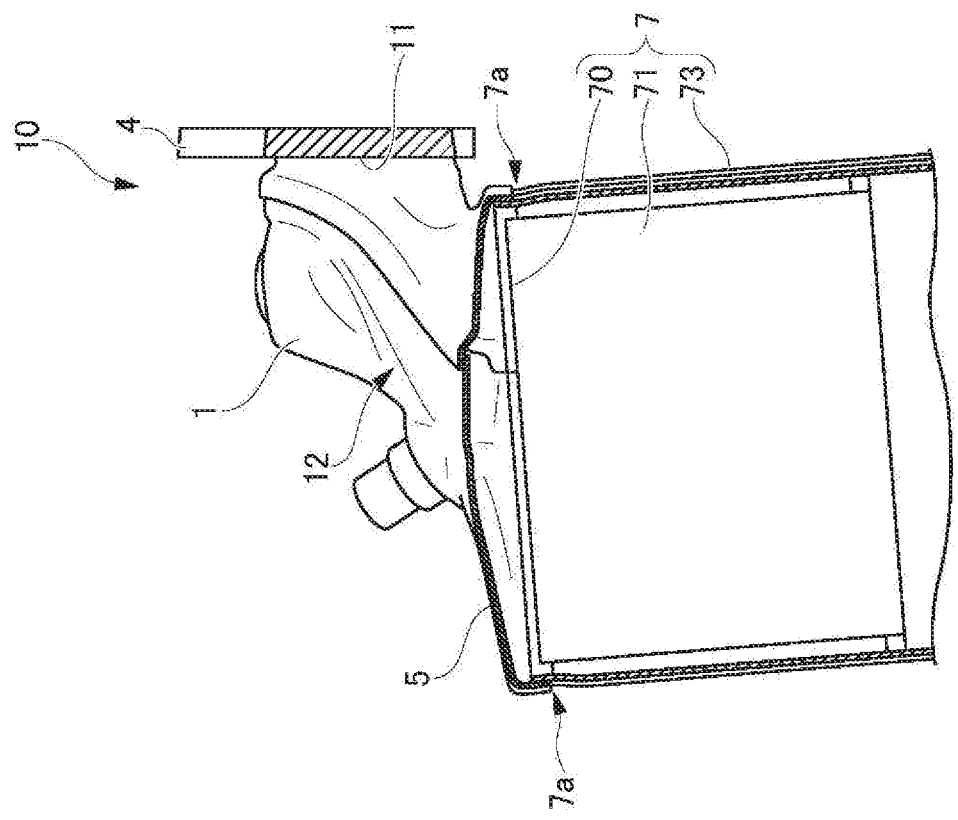
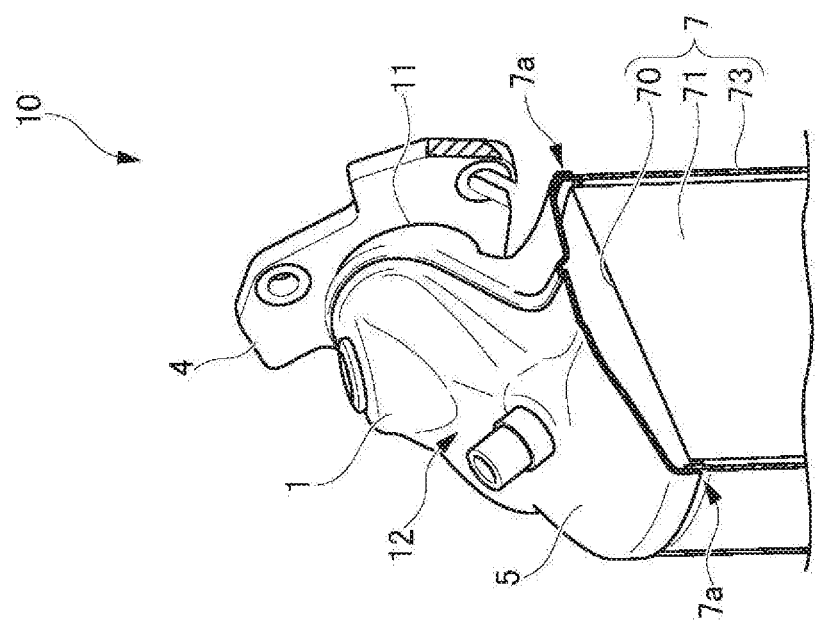
FIG. 9

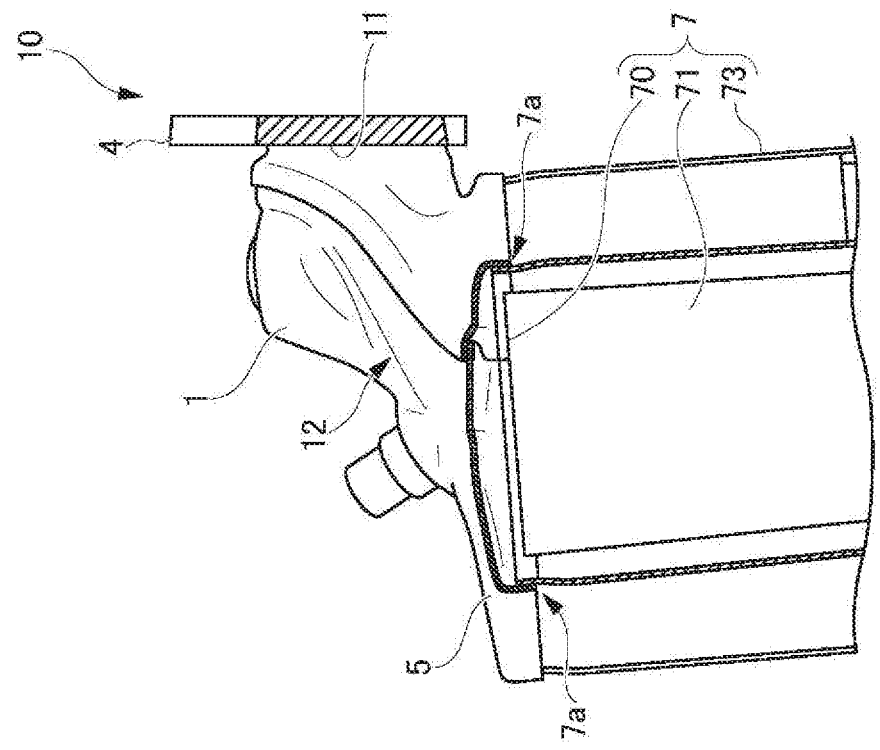
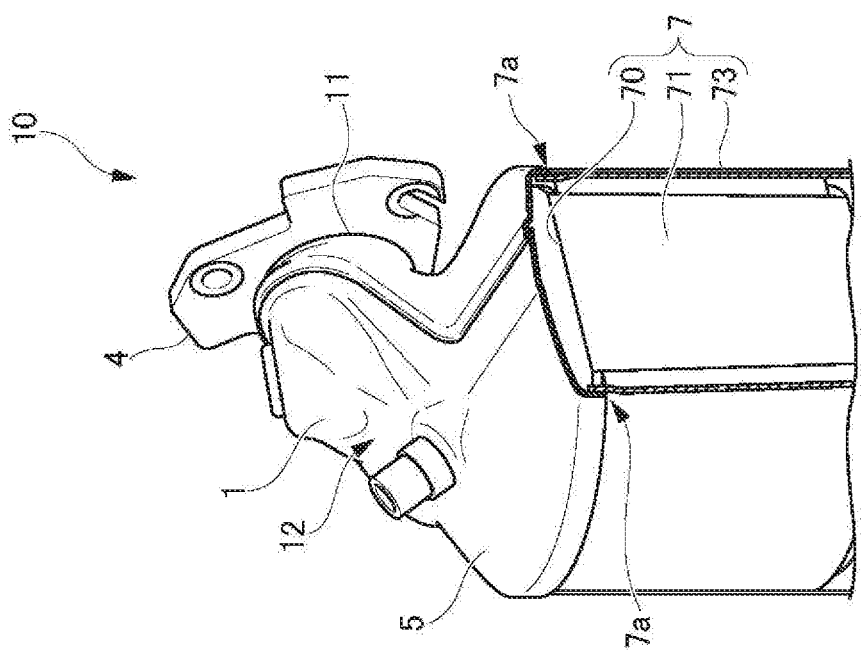
FIG. 10

EXHAUST PIPE STRUCTURE FOR INTERNAL COMBUSTION ENGINE

TECHNICAL FIELD

The present invention relates to an exhaust pipe structure for an internal combustion engine. In detail, it relates to an exhaust pipe structure for an internal combustion engine in which an exhaust purifying catalyst device is arranged in the vicinity of the internal combustion engine within an engine room.

BACKGROUND ART

Conventionally, an exhaust pipe structure for an internal combustion engine has been known in which an exhaust purifying catalyst device is arranged in the vicinity of the internal combustion engine within an engine room. With this exhaust pipe structure, due to restrictions in layout, a cylindrical exhaust purifying catalyst device is arranged in a state orienting the center axis line thereof in a substantially vertical direction. For this reason, the exhaust pipe extending from the internal combustion engine side greatly bends downwards after extending in a substantially horizontal direction, and is connected to a upper end of the exhaust purifying catalyst device.

However, with the above-mentioned such exhaust pipe structure, the flow of exhaust gas is concentrated on the outer side of the curved part of the exhaust pipe, and the exhaust gas of concentrated flow flows into the exhaust purifying catalyst device. For this reason, since the exhaust gas is not flowing uniformly into the exhaust purifying catalyst device, a rapid temperature rise of the exhaust purifying catalyst has been difficult, and it has not been possible to sufficiently exhibit the purifying performance of the exhaust purifying catalyst device. Depending on the case, the exhaust purifying catalyst has deteriorated due to the uneven flow of exhaust gas. Therefore, an exhaust pipe structure has been proposed that provides, to the inner wall of an exterior portion of the above-mentioned curved part, a gas rectifying part for causing the flow of exhaust gas to approach the inner side (for example, refer to Patent Document 1).

Patent Document 1: Japanese Unexamined Patent Application, Publication No. 2006-17018

DISCLOSURE OF THE INVENTION

Problems to be Solved by the Invention

However, with the exhaust pipe structure of Patent Document 1, since the exhaust pipe extending from the internal combustion engine side is formed to greatly bend downwards after ending in a substantially horizontal direction, the length of the exhaust pipe is long. For this reason, due to requiring to ensure a large installation space for the exhaust pipe, the heat capacity of the exhaust pipe is large, and thus rapid temperature rise of the exhaust purifying catalyst arranged on the downstream side thereof has been difficult.

The present invention has been made taking account of the above, and an object thereof is to provide an exhaust pipe structure for an internal combustion engine that can sufficiently suppress uneven flow of exhaust gas flowing into the exhaust purifying catalyst device with an exhaust pipe structure that is smaller than conventional, as well as being able to rapidly raise the temperature of the exhaust purifying catalyst.

Means for Solving the Problems

In order to achieve the above-mentioned object, the present invention provides an exhaust pipe structure (e.g., the exhaust pipe structure 10 described later) for an internal combustion engine in which a substantially tubular exhaust purifying catalyst device (e.g., the exhaust purifying catalyst device 7 described later) including an exhaust purifying catalyst is disposed in a vicinity of the internal combustion engine (e.g., the engine 2 described later) within an engine room (e.g., the engine room E described later), the exhaust pipe structure including: an exhaust pipe main part (e.g., the exhaust pipe main part 1 described later) which curves from a side of the internal combustion engine and extends towards an end (e.g., the upper end 70 described later) in a center axis line (e.g., the center axis line X described later) direction of the exhaust purifying catalyst device; and an exhaust pipe introduction part (e.g., the exhaust pipe introduction part 5 described later) that connects the exhaust pipe main part and the end of the exhaust purifying catalyst device, and introduces exhaust gas from the exhaust pipe main part into the exhaust purifying catalyst device, in which the exhaust pipe main part is disposed so that a center (e.g., the center C1 described later) of an exhaust inlet (e.g., the exhaust inlet 11 described later) on a side of the internal combustion engine is offset from the center axis line of the exhaust purifying catalyst device when viewed from a side of the exhaust inlet, and an end thereof (e.g., the end 12 on the exhaust purifying catalyst device side described later) on a side of the exhaust purifying catalyst device is connected to an outer circumferential side of the exhaust pipe introduction part, and in which the exhaust pipe introduction part has a space from an end face (e.g., the upper end face 70a described later) of the end of the exhaust purifying catalyst device, and extends obliquely to a side of the exhaust purifying catalyst device from an end of the exhaust pipe main part on a side of the exhaust purifying catalyst device until an outer circumferential end (e.g., the outer circumferential end 7a described later) of the exhaust purifying catalyst device.

The present invention provides the exhaust pipe main part so as to curve and extend, and arranges so that the center of the exhaust inlet of the exhaust pipe main part is offset from the center axis line of the exhaust purifying catalyst device when viewing from the exhaust inlet side. Similarly, the end on the exhaust purifying device side of the exhaust pipe main part is connected to the outer circumferential side of the exhaust pipe introduction part connecting the exhaust pipe main part and the end of the exhaust purifying catalyst device. In addition, the exhaust pipe introduction part is provided so as to have a space from the upper end face of the end of the exhaust purifying catalyst device, as well as extend obliquely to the exhaust purifying catalyst device side from the end on the exhaust purifying catalyst device side of the exhaust pipe main part until the outer circumferential end of the exhaust purifying catalyst device. The exhaust gas flowing out from the exhaust pipe main part to the exhaust pipe introduction part thereby becomes swirl flow at the exhaust pipe introduction part and flows into the exhaust purifying catalyst device. Therefore, according to the present invention, by causing swirl flow to generated in the flow of exhaust gas, it is possible to sufficiently suppress uneven flow of exhaust gas flowing into the exhaust purifying catalyst device. For this reason, since it is possible to lead the exhaust gas to the exhaust purifying catalyst device with good balance, it is possible to make uniform and optimize the exhaust gas exposure to the exhaust purifying catalyst, and thus possible to rapidly raise the temperature of the exhaust purifying catalyst on the downstream side. In addition, according to the exhaust pipe structure of the present invention, it is possible to make the length of the exhaust pipe shorter than conventional, and thus it is possible to realize optimization of the exhaust gas exposure to the exhaust purifying catalyst in a shorter distance than conventional. Therefore, it is possible to achieve space savings with a smaller exhaust pipe structure than conventional, and possible to reduce the heat capacity of the exhaust pipe, and thus the exhaust purifying catalyst can be raise in temperature more rapidly.

In addition, with the present invention, it is preferable to further include: an exhaust sensor (e.g., the exhaust sensor 9 described later) having a detection element (e.g., the detection element 91 described later) disposed in the vicinity of a boundary (e.g., the boundary 50 described later) between the exhaust pipe main part and the exhaust pipe introduction part.

The present invention arranges the detection element of the exhaust sensor in the vicinity of a boundary between the exhaust pipe main part and exhaust pipe introduction part. The exhaust gas flowing out from the exhaust pipe main part to the exhaust pipe introduction part becomes swirl flow, as mentioned above. For this reason, by arranging the detection element of the exhaust sensor in the vicinity of a boundary between the exhaust pipe main part and exhaust pipe introduction part serving as the starting point of swirl flow, it is possible to capture the main flow of exhaust gas prior to the exhaust gas becoming swirl flow and diffusing, and thus possible to improve the detection precision of the exhaust sensor.

In addition, with the present invention, it is preferable for the exhaust pipe introduction part to slope to a side of the exhaust purifying catalyst device in a spiral shape along a circumferential direction thereof, from an end of the exhaust pipe main part on a side of the exhaust purifying catalyst device.

With the present invention, the exhaust pipe introduction part connecting the exhaust pipe main part and the end of the exhaust purifying catalyst device is formed so as to slope to the exhaust purifying catalyst device side in a spiral shape along the circumferential direction thereof from the end on the exhaust purifying catalyst device side (downstream side) of the exhaust pipe main part. According to the present invention, since it is thereby possible to more reliably cause swirl flow to generate in the flow of exhaust gas, the aforementioned effects are more reliably exerted.

Effects of the Invention

According to the present invention, it is possible to provide an exhaust pipe structure for an internal combustion engine that can sufficiently suppress uneven flow of exhaust gas flowing into the exhaust purifying catalyst device with an exhaust pipe structure that is smaller than conventional, as well as being able to rapidly raise the temperature of the exhaust purifying catalyst.

BRIEF DESCRIPTION OF THE DRAWINGS

FIG. 2 is a side view of an exhaust system including the exhaust pipe structure for an internal combustion engine according to the embodiment;

FIG. 6 is a cross-sectional view of the exhaust pipe structure for an internal combustion engine according to the embodiment;

FIG. 7 is a cross-sectional view of the exhaust pipe structure for an internal combustion engine according to the embodiment;

FIG. 9 is a cross-sectional view of the exhaust pipe structure for an internal combustion engine according to the embodiment;

FIG. 10 is a cross-sectional view of the exhaust pipe structure for an internal combustion engine according to the embodiment;

PREFERRED MODE FOR CARRYING OUT THE INVENTION

Figure 1:
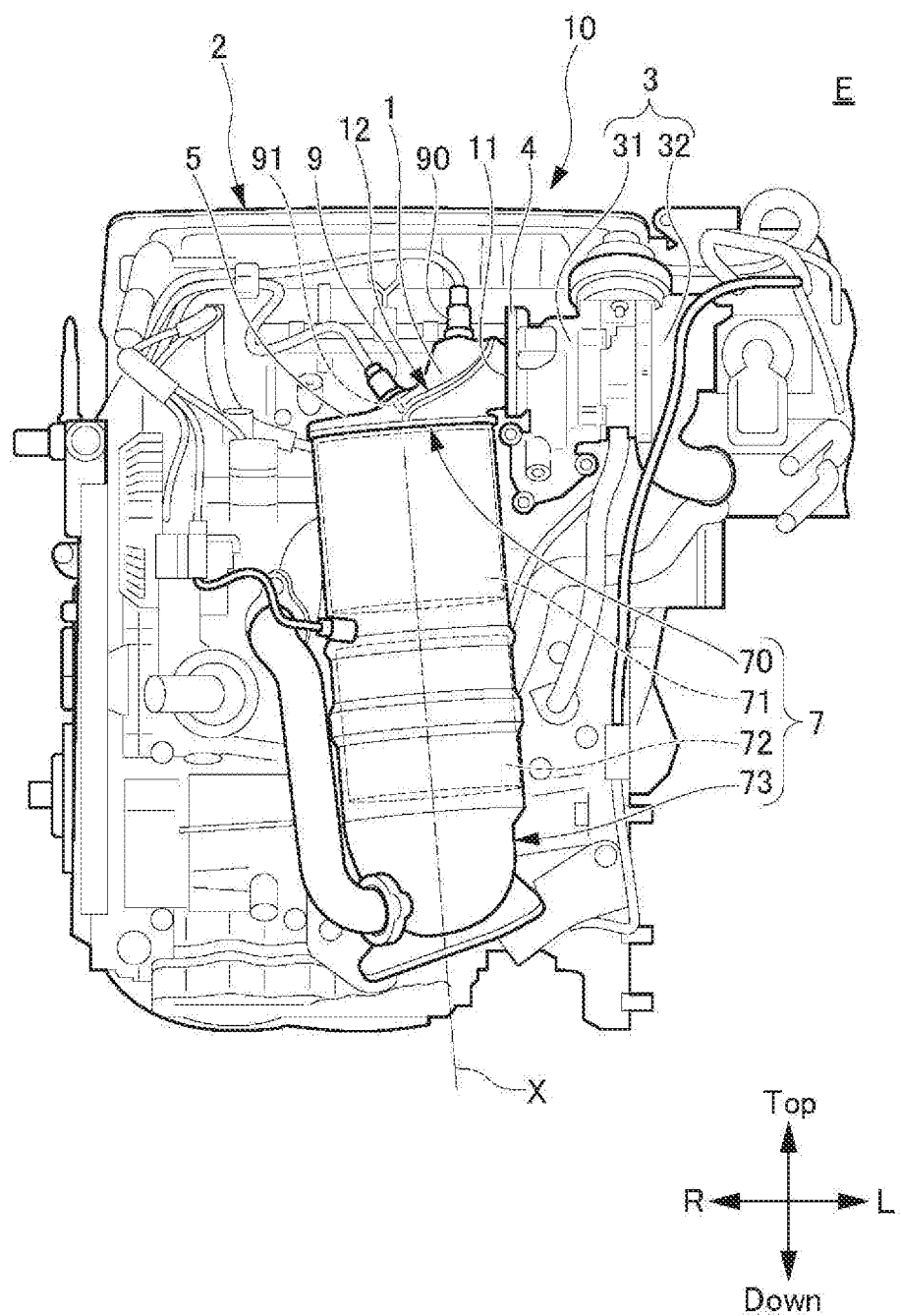
FIG. 1 is a front view of an exhaust system including an exhaust pipe structure for an internal combustion engine according to an embodiment of the present invention.

An embodiment of the present invention will be explained in detail while referencing the drawings. It should be noted that Fr shown in the drawings indicates vehicle forward, Rr indicates vehicle rearward, Top indicates above the vehicle, Down indicates below the vehicle, R indicates the right direction viewed from the driver's seat, and L indicates the left direction viewed from the driver's seat.

Figure 3:
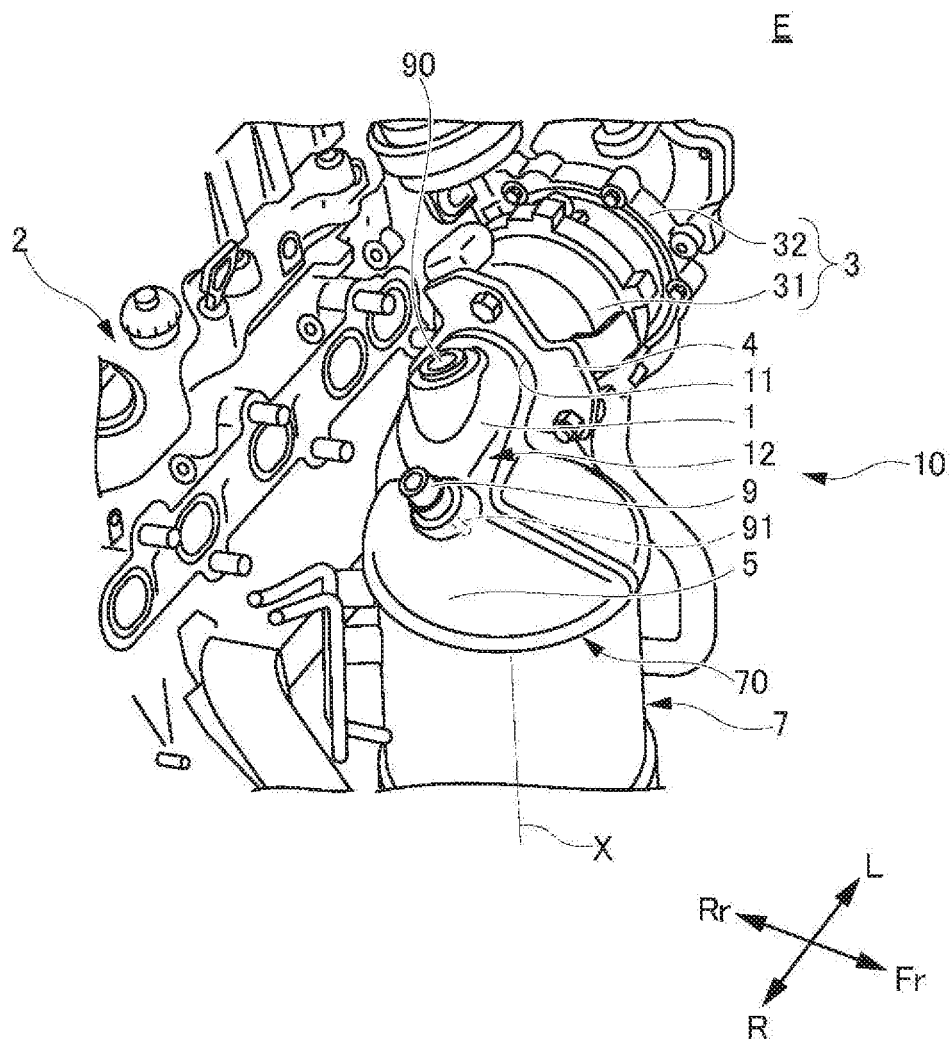
FIG. 3 is a perspective view of an exhaust system including the exhaust pipe structure for an internal combustion engine according to the embodiment.

First, the overall configuration of an exhaust pipe structure for an internal combustion engine according to an embodiment of the present invention will be explained by referencing FIGS. 1 to 3. Herein, FIG. 1 is a front view (drawing viewing from a vehicle forward side) of an exhaust system including the exhaust pipe structure for an internal combustion engine according to the present embodiment. FIG. 2 is a side view (right side view) of the exhaust system including the exhaust pipe structure for an internal combustion engine according to the present embodiment. FIG. 3 is a perspective view (perspective view enlarging main parts) of the exhaust system including the exhaust pipe structure for an internal combustion engine according to the present embodiment.

As shown in FIGS. 1 to 3, an exhaust pipe structure 10 for an internal combustion engine according to the present embodiment is arranged within an engine room E, and is arranged at a vehicle forward side of an internal combustion engine (hereinafter referred to as "engine") 2 installed in a vehicle (not illustrated). The engine 2 is a diesel engine that directly injects fuel into the combustion chamber of each cylinder (not illustrated).

The exhaust pipe structure 10 for the engine 2 according to the present embodiment includes an exhaust pipe main part 1, turbocharger 3 serving as a supercharging device, exhaust pipe introduction part 5, exhaust purifying catalyst device 7, and exhaust sensor 9.

The turbocharger 3 is arranged on the upstream side of the exhaust pipe main part 1. The turbocharger 3 includes a turbine housing 31 that houses a turbine (not illustrated) inside, and a compressor housing 32 that houses a compressor (not illustrated) inside. This turbocharger 3 pressurizes intake air by the turbine rotationally driving by the kinetic energy of exhaust gas, and the compressor rotationally driving by this rotational driving.

The exhaust pipe main part 1 curves from the turbocharger 3 arranged on the engine 2 side and extends towards one end in the center axis line X direction of the exhaust purifying catalyst device 7 described later, i.e. the upper end 70 thereof. In this way, the exhaust pipe main part 1 of the present embodiment differs from the shape of a conventional exhaust pipe (main part) formed to greatly bend downwards after extending in a substantially horizontal direction from the engine side, and the length of the exhaust pipe main part 1 is formed shorter than conventionally.

In addition, the exhaust inlet 11 on the upstream side of the exhaust pipe main part 1 is connected to the outlet of the turbocharger 3 via a gasket 4 as described later. On the other hand, as is evident from FIG. 2 or FIG. 3, an end 12 on the exhaust purifying catalyst device 7 side (downstream side) of the exhaust pipe main part 1 is connected to an outer circumferential side of the exhaust pipe introduction part 5 described later. This point also differs from the conventional exhaust pipe (main part) which is connected to the central part of the exhaust pipe introduction part, or central part of the exhaust purifying catalyst device. It should be noted that a more detailed structure of the exhaust pipe main part 1 will be described at a later stage.

The exhaust pipe introduction part 5 connects with the exhaust pipe main part 1 and an upper end 70 of the exhaust purifying catalyst device 7 described later. Herein, "connected" in the present invention includes a case of the exhaust pipe main part 1 and exhaust pipe introduction part 5 being integrated to be configured by a singular member as in the present embodiment, and a case of the exhaust pipe main part and exhaust pipe introduction part formed as separate members being joined. In the present embodiment, the exhaust pipe main part 1 and exhaust pipe introduction part 5 are integrated to be configured as a single member, and this exhaust pipe main part 1 and exhaust pipe introduction part 5 are connected to each other by a connecting face 13 (refer to FIG. 5).

This exhaust pipe introduction part 5 introduces exhaust gas flowing in the exhaust pipe main part 1 into the exhaust purifying catalyst device 7. The exhaust pipe introduction part 5 is provided in a substantially circular shape in a plan view, so as to cover the upper end 70 of the cylindrical exhaust purifying catalyst device 7 described later. It should be noted that the detailed structure of the exhaust pipe introduction part 5 will be described at a later stage.

The exhaust purifying catalyst device 7 is arranged in the vicinity (directly below) the engine 2 in the engine room E. In more detail, the exhaust purifying catalyst device 7 is arranged directly below the turbocharger 3. The exhaust purifying catalyst device 7 is cylindrical, and is arranged along a lateral side on the vehicle forward side of the engine 2 in a state orienting the center axis line X thereof in a substantially vertical direction. Therefore, the exhaust gas flows in the exhaust purifying catalyst device 7 downward from above, and in the course thereof, NOx, CO and HC in the exhaust gas are purified, along with particulate matter (hereinafter referred to as "PM") in the exhaust gas being purified.

As shown in FIG. 1 and FIG. 2, the exhaust purifying catalyst device 7 includes an exhaust purifying catalyst section 71, diesel particulate filter (hereinafter referred to as "DPF") 72, and case 73. The exhaust purifying catalyst section 71 and DPF 72 are housed inside of a single case 73, and arranged adjacently to each other.

The exhaust purifying catalyst section 71 purifies NOx, CO and HC in exhaust gas. The exhaust purifying catalyst section 71 is configured by a honeycomb substrate on which the exhaust purifying catalyst is supported, and is housed inside of the case 73 via a retaining matt (not illustrated). The honeycomb substrate is a flow-through type honeycomb substrate having a cross-section formed in a substantially round columnar shape. As the material of the honeycomb substrate, cordierite, alumina titanate or mullite can be exemplified. As the exhaust purifying catalyst, an oxidation catalyst and/or NOx catalyst are used. For example, at least one noble metal among Pt, Pd and Rh, zeolite, Ba and Ce are included. The NOx, CO and HC in the exhaust gas are purified by this exhaust purifying catalyst.

The DPF 72 collects PM in the exhaust gas. The DPF 72 is configured by a filter on which a PM combustion catalyst is supported, and is housed inside of the case 73 via the retaining matt (not illustrated). The filter is a wall-flow type filter having a cross-section formed in a substantially round cylindrical shape. As the material of the filter, silicon carbide (SiC), cordierite, alumina titanate or mullite can be exemplified. The PM combustion catalyst is almost uniformly supported over the entirety of the filter, whereby the PM collected on the filter is combustively removed. As the PM combustion catalyst, for example, those containing Ag and at least one noble metal among Pt and Pd can be used. This Ag-based PM combustion catalyst has the most superior PM oxidation ability, as well as being able to oxidatively purify PM from a lower temperature compared to other PM combustion catalysts.

The case 73 is cylindrical, and houses the exhaust purifying catalyst section 71 and DPF 72 as mentioned above. The case 73 is configured from a metal such as SUS. The case 73 is configured from a clam shell-type case member constituted by two case halves divided in the circumferential direction along the center axis line X. The case 73 is formed by butt welding to integrate together these two case halves.

The temperature sensor 9 is a temperature sensor which detects the temperature of exhaust gas. The temperature sensor 9 includes a detection element 91 at a leading end thereof, and detects the temperature of the exhaust gas with this detection element 91. The temperature sensor 9 of the present embodiment has a characteristic in the arrangement of the detection element 91 thereof. The arrangement of this detection element 91 will be described in detail at a later stage.

It should be noted that, with the exhaust pipe structure 10 of the present embodiment, an LAF sensor 90 is also mounted at the top of the exhaust pipe main part 1. The LAF sensor 90 becomes able to detect the air/fuel ratio of the exhaust gas, by a detection element (not illustrated) being inserted from above into the exhaust pipe main part 1.

Figure 4:
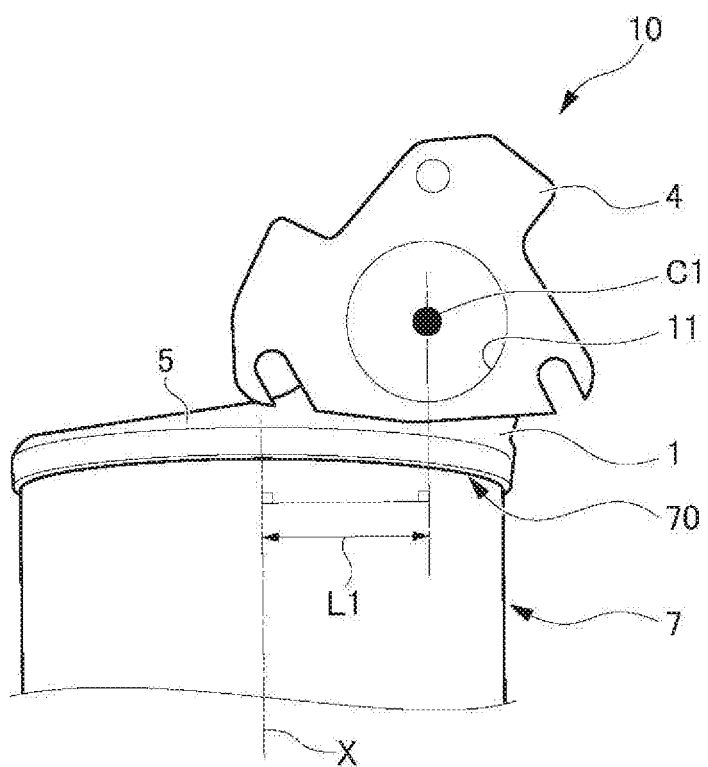
FIG. 4 is a drawing viewing the exhaust pipe structure for an internal combustion engine according to the embodiment from an exhaust inlet side of an exhaust pipe main part.

Next, a more detailed structure of the exhaust pipe main part 1 will be explained in detail by referencing FIGS. 4 and 5. Herein, FIG. 4 is a drawing viewing the exhaust pipe structure 10 according to the present embodiment from an exhaust inlet 11 side of the exhaust pipe main part 1. More specifically, it is a drawing viewing the exhaust pipe structure 10 from a direction orthogonal to the exhaust inlet 11 of the exhaust pipe main part 1. In addition, FIG. 5 is a side view of the exhaust pipe structure 10 according to the present embodiment.

As shown in FIG. 4, a gasket 4 for coupling to the outlet of the turbocharger 3 is connected to the exhaust inlet 11 on the upstream side of the exhaust pipe main part 1. In addition, when viewing the exhaust pipe main part 1 from the exhaust inlet 11 side as shown in FIG. 4, a center C1 of the circular exhaust inlet 11 is arranged to be offset from the center axis line X of the exhaust purifying catalyst device 7. In other words, when viewing from the exhaust inlet 11 side, the center C1 of the exhaust inlet is not positioned on the center axis line X of the exhaust purifying catalyst device 7. More specifically, with the present embodiment, the center C1 of the exhaust inlet 11 is arranged to be separated by a distance L1 in a direction orthogonal to the center axis line X from the center axis line X of the exhaust purifying catalyst device 7. In this point, the exhaust pipe structure 10 of the present embodiment differs from the conventional exhaust pipe structure in which the center of the exhaust inlet is normally arranged on the center axis line of the exhaust purifying device when viewing the exhaust pipe main part from the exhaust inlet side.

Herein, the outlet center of the turbine housing 31 (not illustrated) is arranged so as to overlap with the center C1 of the exhaust inlet 11 of the exhaust pipe main part 1. Therefore, with the exhaust pipe structure 10 of the present embodiment, when viewing the exhaust pipe main part 1 from the outlet side of the turbine housing 31, the outlet center of the turbine housing 31 is arranged to be offset from the center axis line X of the exhaust purifying catalyst device 7, similarly to the aforementioned center C1 of the exhaust inlet 11.

Figure 5:
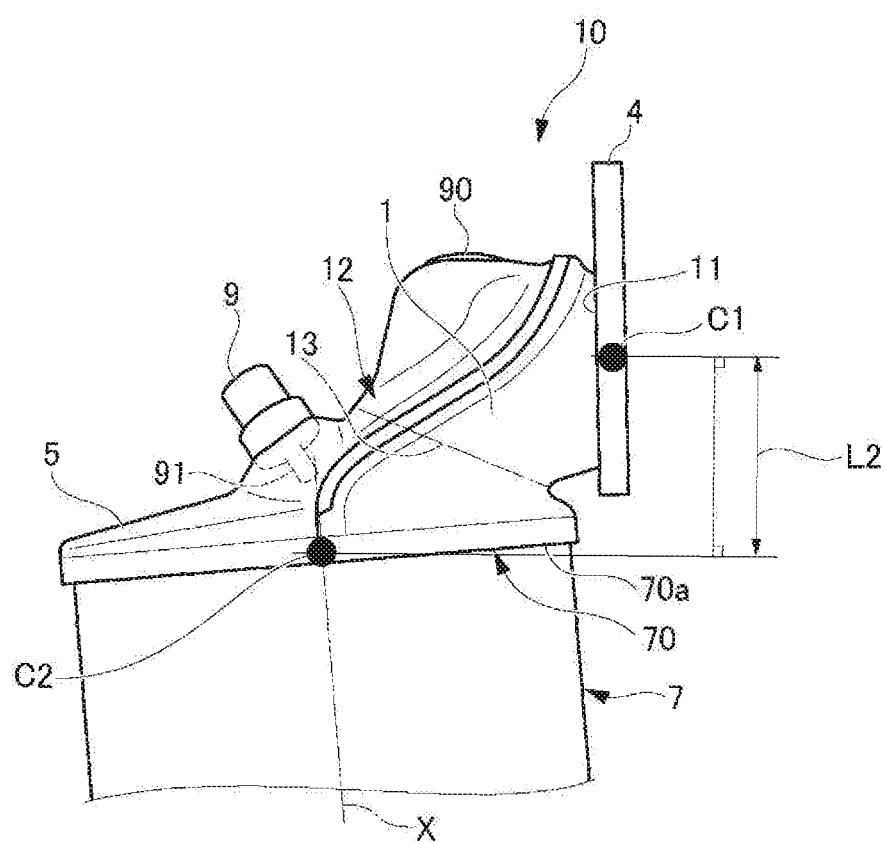
FIG. 5 is a side view of the exhaust pipe structure for an internal combustion engine according to the embodiment.
Figure 8:
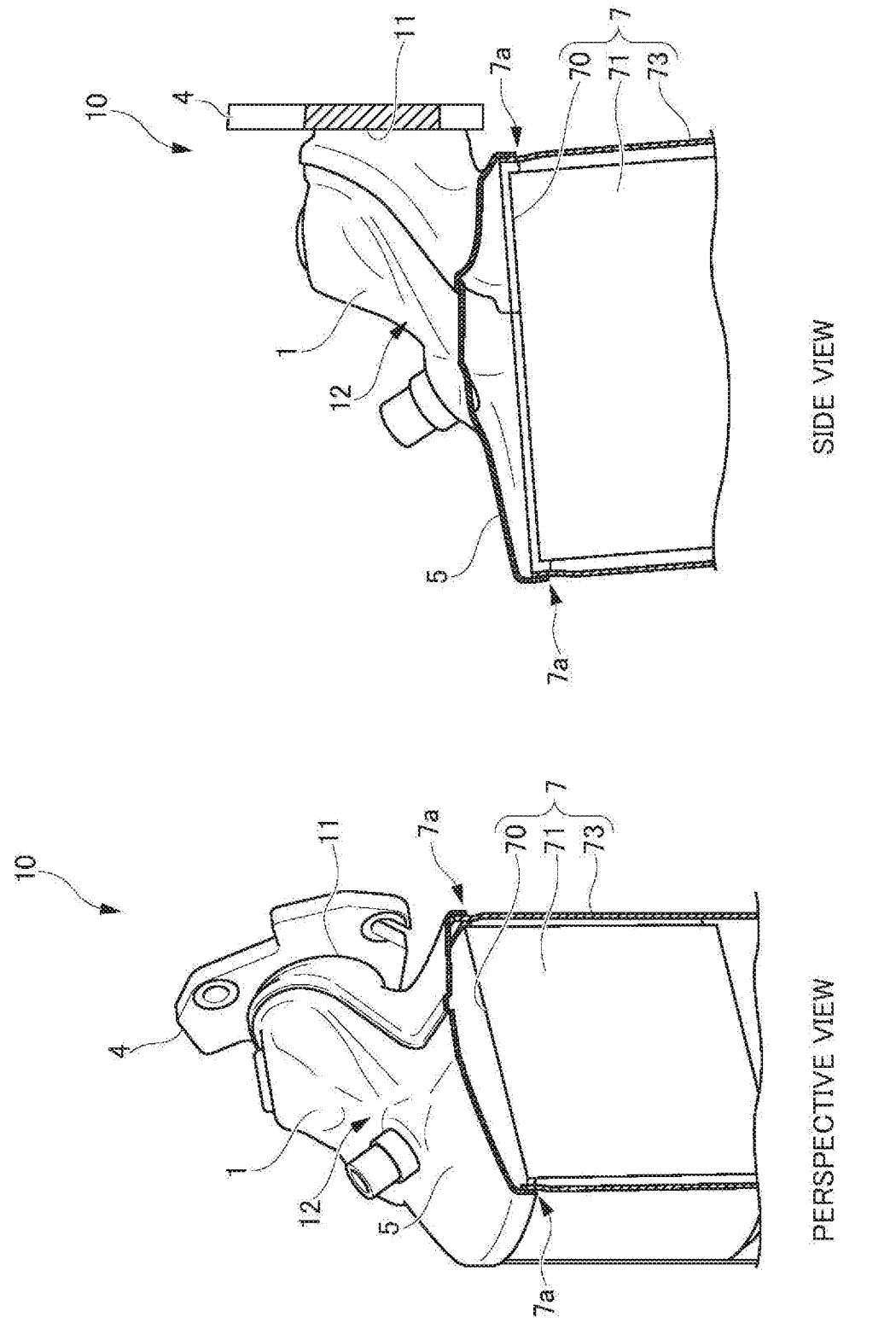
FIG. 8 is a cross-sectional view of the exhaust pipe structure for an internal combustion engine according to the embodiment.

In addition, as shown in FIG. 5, the center C1 of the exhaust inlet 11 is arranged to be separated by a distance L2 in the vertical direction relative to a center C2 of the upper end face 70a of the upper end 70 positioned on the center axis line X of the exhaust purifying catalyst device 7. As mentioned above, the exhaust pipe main part 1 of the present embodiment is formed to curve; therefore, since the length is short compared to the conventional exhaust pipe main part, the dimension in the vertical direction is formed to be small. In other words, the distance L2 is set to be small compared to a conventional exhaust pipe (main part). It should be noted that the exhaust pipe main part 1 is connected to the exhaust pipe introduction part 5 by the connecting face 13 shown in FIG. 5.

Next, the detailed structure of the exhaust pipe introduction part 5 will be explained in detail by referencing FIGS. 6 to 10. Herein, FIGS. 6 to 10 are cross-sectional views of the exhaust pipe structure 10 for the engine 2 according to the present embodiment. More specifically, FIGS. 6 to 10 are cross-sectional views when cutting in vertical planes at five places while shifting the position from one outer circumferential side to which the end 12 on the exhaust purifying catalyst device 7 side (downstream side) of the exhaust pipe main part 1 is connected, towards the other outer circumferential side opposite the radial direction. As the drawing number increases, cross-sectional views more to the other outer circumferential side are shown. It should be noted that these drawings are illustrated to omit the exhaust sensor 9 and air/fuel ratio sensor 90.

As is evident from these FIGS. 6 to 10, the exhaust pipe introduction part 5 has a space from the upper end face 70a of the upper end 70 of the exhaust purifying catalyst device 7. In this point, the exhaust pipe structure 10 of the present embodiment differs from the conventional exhaust pipe structure in which the exhaust pipe main part or exhaust pipe introduction part is connected without a space from the upper end face of the exhaust purifying catalyst device.

In addition, the exhaust pipe introduction part 5 extends obliquely to the exhaust purifying catalyst device 7 side (downstream side) from the end 12 on the exhaust purifying catalyst device 7 side of the exhaust pipe main part 1 until an outer circumferential end 7a of the exhaust purifying catalyst device 7. The exhaust gas flowing out from the exhaust pipe main part 1 to the exhaust pipe introduction part 5 will thereby become swirl flow at the exhaust pipe introduction part 5 and flow into the exhaust purifying catalyst device 7.

In more detail, the exhaust pipe introduction part 5 slopes from the end 12 on the exhaust purifying catalyst device 7 side (downstream side) of the exhaust pipe main part 1 to the exhaust purifying catalyst device 7 side in a gentle spiral shape along the circumferential direction thereof. In other words, the exhaust pipe introduction part 5 slopes downwards in a gentle spiral shape more as approaching the downstream side (exhaust purifying catalyst device 7 side). Therefore, in the exhaust pipe introduction part 5, the other outer circumferential side, which opposes to interpose the center of the exhaust purifying catalyst device 7, is positioned lower than the one outer circumferential side at which the end 12 on the exhaust purifying catalyst device 7 side (downstream side) of the exhaust pipe main part 1 is connected. Swirl flow of exhaust gas will thereby be more reliably formed.

Figure 11:
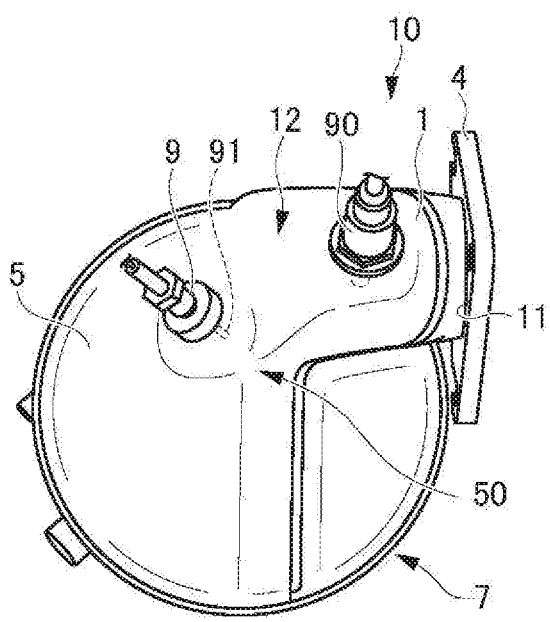
FIG. 11 is a plan view of the exhaust pipe structure for an internal combustion engine according to the embodiment.
Figure 12:
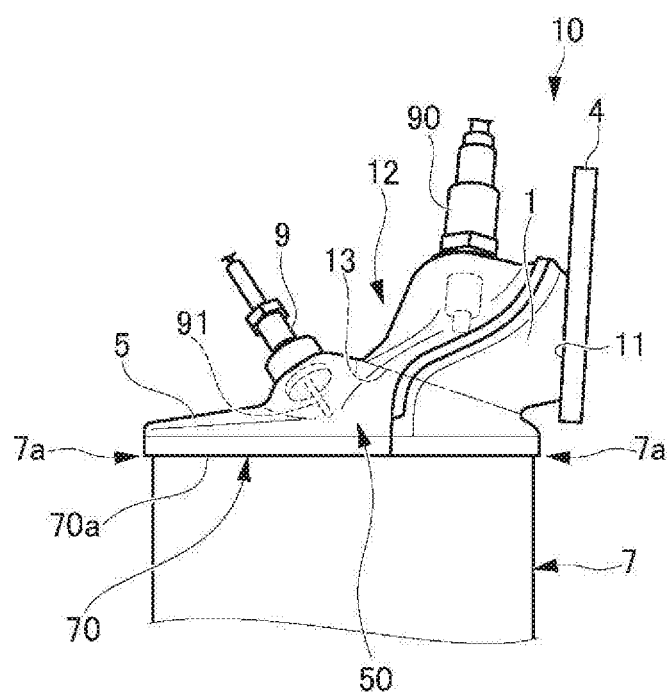
FIG. 12 is a side view of the exhaust pipe structure for an internal combustion engine according to the embodiment.
Figure 13:
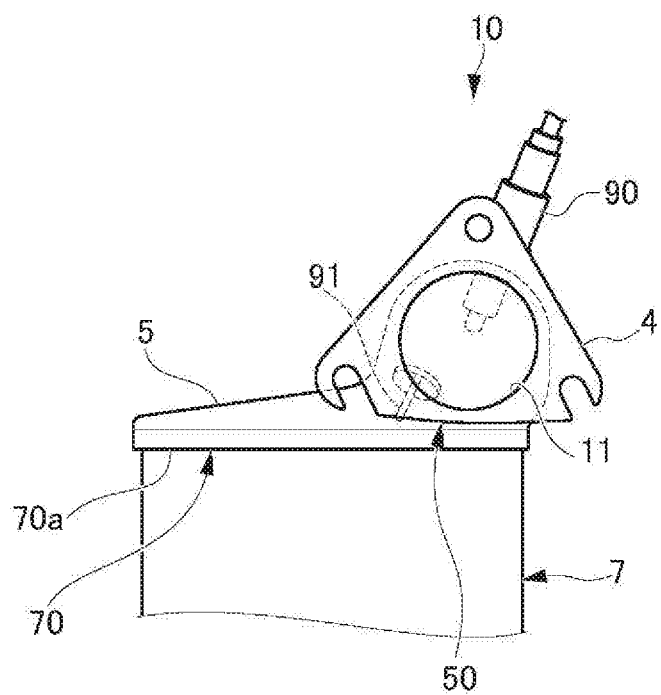
FIG. 13 is a drawing viewing the exhaust pipe structure for an internal combustion engine according to the embodiment from an exhaust inlet side of an exhaust pipe main part.

Next, the arrangement of the detection element 91 of the exhaust sensor 9 will be explained by referencing FIGS. 11 to 13. Herein, FIG. 11 is a plan view of the exhaust pipe structure 10, FIG. 12 is a side view of the exhaust pipe structure 10, FIG. 13 is a drawing viewing the exhaust pipe structure 10 from the exhaust inlet 11 side of the exhaust pipe main part 1, and all are drawings accurately showing the arrangement of the detection element 91 of the exhaust sensor 9. It should be noted that, although FIGS. 11 to 13, show an example in which the shape of the gasket 4 differs compared to the aforementioned FIGS. 1 to 10, other configurations thereof are the same.

As shown in FIGS. 11 to 13, the detection element 91 of the exhaust sensor 9 is arranged in the vicinity of a boundary 50 between the exhaust pipe main part 1 and exhaust pipe introduction part 5. Herein, boundary 50 in the present invention is a portion of the exhaust pipe introduction part 5 on the outer circumferential side near the exhaust pipe main part 1, and more specifically, indicates the vicinity of the exhaust pipe introduction part 5 at the connecting face 13 between the exhaust pipe main part 1 and exhaust pipe introduction part 5. This boundary 50 is a portion serving as the starting point for the swirl flow of exhaust gas produced by the aforementioned exhaust pipe introduction part 5, and is a portion through which the main flow of exhaust gas passes before becoming swirl flow and diffusing. By the detection element 91 being arranged at the portion through which the main flow of exhaust gas passes in this way, high detection precision will be obtained. In addition, as shown in FIGS. 11 to 13, since the LAF sensor 90 is also provided at the exhaust pipe main part 1 which is on the upstream side from the boundary 50 which is the starting point for swirl flow, high detection precision will be obtained by the main flow of exhaust gas passing therethrough.

Next, the UI value for exhaust gas when causing exhaust gas to flow into the exhaust purifying catalyst device 7 by running the engine 2 at predetermined running conditions will be explained relative to the exhaust pipe structure 10 for the engine 2 according to the present embodiment. Herein, UI value is a value used as an index for the uniformity of the flow of a fluid, and is obtained by calculation according to the following Formula (1).

$$UI = 1 - \Sigma\{|Vi - Vave| \times Si/(2 \times Vave \times S)\} \quad \text{Formula (1)}$$

In Formula (1) above, Vi represents the flow velocity (exhaust concentration) for each area formed by dividing the flowpath cross-section, and Vave represents the average flow velocity (cross-sectional exhaust concentration) in the overall flowpath cross-section. In addition, Si represents the area of each area, and S represents the total area of the flowpath cross-section.

Figure 14:
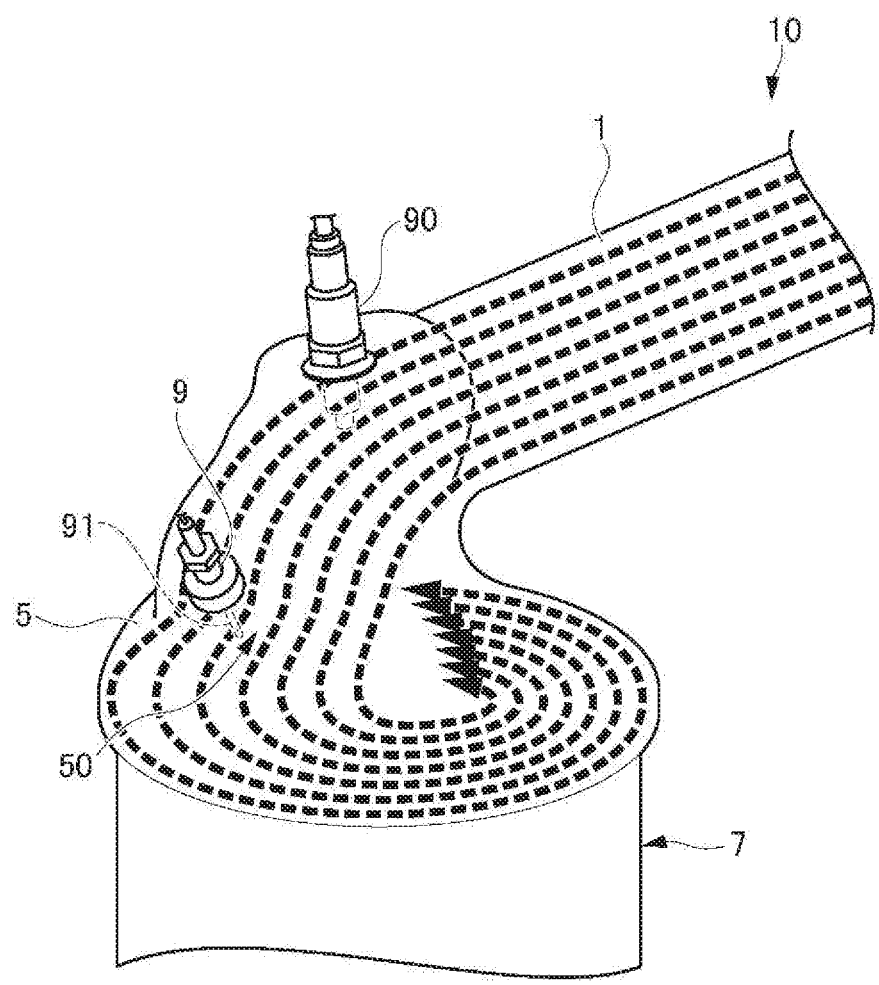
FIG. 14 is a drawing schematically showing the flow of exhaust gas in the exhaust pipe structure for an internal combustion engine according to the embodiment.
Figure 15:
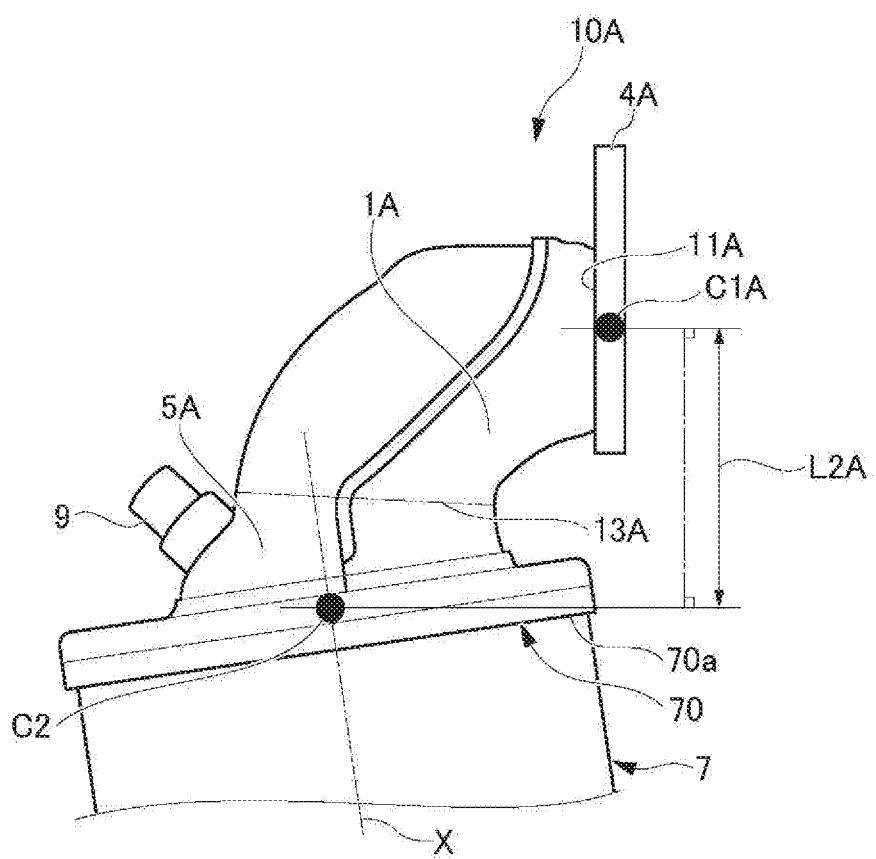
FIG. 15 is a side view of a conventional exhaust pipe structure for an internal combustion engine.

FIG. 14 is a view schematically showing the flow of exhaust gas when causing exhaust gas to flow into the exhaust pipe structure 10 for the engine 2 according to the present embodiment. In FIG. 15, the black arrows indicate the flow of exhaust gas. As shown in FIG. 14, with the exhaust pipe structure 10 of the present embodiment, it is found that the exhaust gas flowing out from the exhaust pipe main part 1 to the exhaust pipe introduction part 5 will become swirl flow with the starting point of the vicinity of the boundary 50, and flow into the exhaust purifying catalyst device 7.

Therefore, the UI value for the cross-section at the upper end 70 of the exhaust purifying catalyst device 7 according to the present embodiment was calculated following the above Formula (1). For comparison, the UI value was similarly calculated also for the conventional exhaust pipe structure 10A.

Figure 16:
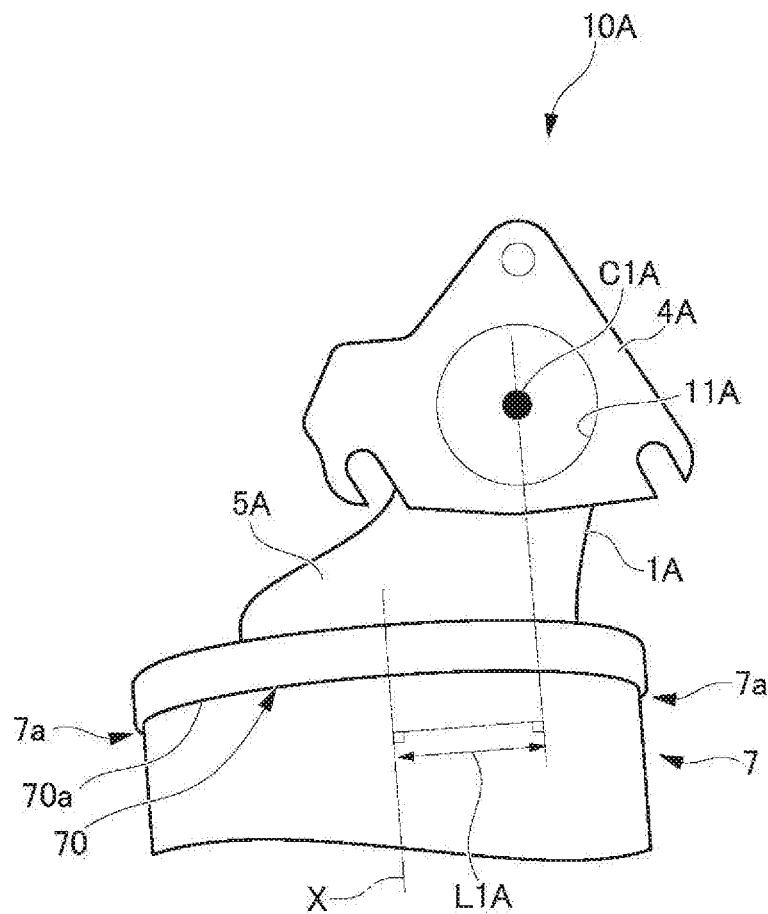
FIG. 16 is a drawing viewing the conventional exhaust pipe structure for an internal combustion engine from an exhaust inlet side of an exhaust pipe main part.

Herein, FIG. 15 is a side view of the conventional exhaust pipe structure 10A. FIG. 16 is a drawing viewing a conventional exhaust pipe structure 10A from an exhaust inlet 11A side of a exhaust pipe main part 1A. The conventional exhaust pipe structure 10A shown in FIG. 15 and FIG. 16 has a different configuration of the exhaust pipe main part 1A and exhaust pipe introduction part 5A from the present embodiment.

More specifically, the exhaust pipe main part 1A resembles the present embodiment in the point of a center C1A of the exhaust inlet 11A being offset by a distance L1A in a direction orthogonal to the center axis line X from the center axis line X of the exhaust purifying catalyst device 7; however, it differs in the point of the exhaust pipe main part 1A being formed to greatly curve downwards, and thus the length is long. For this reason, a distance L2A in the vertical direction between the center C1A of the exhaust inlet 11A and a center C2 of the upper end face 70A of the upper end 70 positioned on the center axis line X of the exhaust purifying catalyst device 7 will become greater than the distance L2 in the present embodiment.

In addition, the exhaust pipe introduction part 5A does not extend obliquely with a space until the outer circumferential end 7a of the exhaust purifying catalyst device 7, and is connected to the upper end face 70a of the exhaust purifying catalyst device 7 without having a space at the outer circumferential end 7a. Therefore, with the outer circumferential end 7a, the exhaust pipe introduction part 5A is formed in a planar shape along the upper end face 70a.

Figure 17:
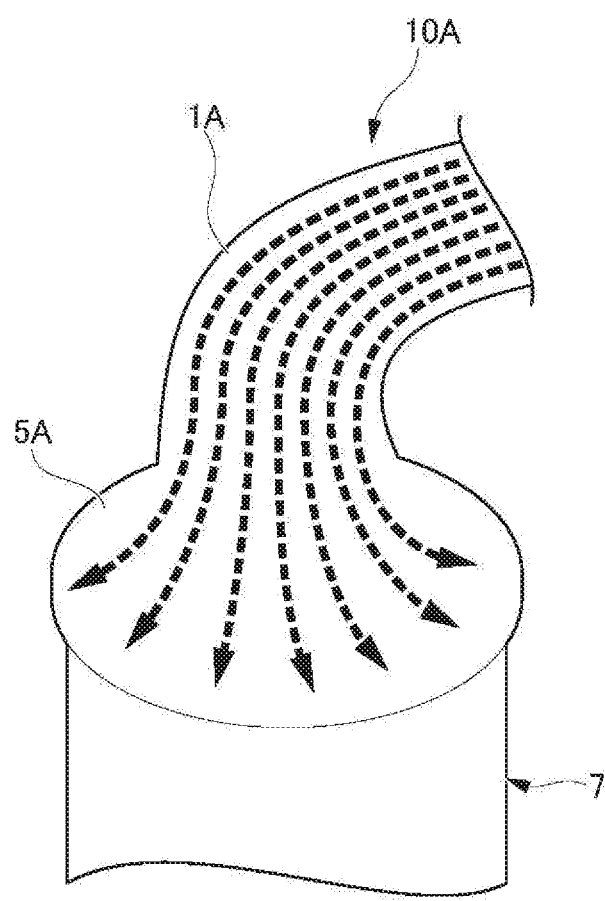
FIG. 17 is a view schematically showing the flow of exhaust gas in the conventional exhaust pipe structure for an internal combustion engine.

FIG. 17 is a view schematically showing the flow of exhaust gas when causing exhaust gas to flow into the conventional exhaust pipe structure 10A. Similarly to FIG. 14, the black arrows indicate the flow of exhaust gas in FIG. 17. With the conventional exhaust pipe structure 10A as shown in FIG. 17, it is found that exhaust gas at the exhaust pipe introduction part 5A diffuses radially and flows into the exhaust purifying catalyst device 7, without becoming swirl flow.

As a result of calculating the UI values at a mass flowrate of 0.05 kg/s for the conventional exhaust pipe structure 10A explained above and the exhaust pipe structure 10 of the present embodiment, it was found that the former was 0.936; whereas, the latter was almost equal at 0.935. In other words, compared to the conventional exhaust pipe structure 10A in which the length of the exhaust pipe main part 1A is long, and exhaust gas is sufficiently diffused and then can be introduced into the exhaust purifying catalyst device 7, the exhaust pipe structure 10 of the present embodiment, irrespective of having a small exhaust pipe main part 1, was confirmed to obtain almost the same UI value. From this result, the exhaust pipe structure 10 of the present embodiment was confirmed to be able to optimize the exhaust gas exposure to the exhaust purifying catalyst, irrespective of the length of the exhaust pipe main part 1 being shorter than conventional.

The operation and effect of the exhaust pipe structure 10 for the engine 2 according to the present embodiment having the above configuration will be explained below. The present embodiment provides the exhaust pipe main part 1 so as to curve and extend, and arranges so that the center 1 of the exhaust inlet 11 of the exhaust pipe main part 1 is offset from the center axis line X of the exhaust purifying catalyst device 7 when viewing from the exhaust inlet 11 side. Similarly, the end 12 on the exhaust purifying device 7 side (downstream side) of the exhaust pipe main part 1 is connected to the outer circumferential side of the exhaust pipe introduction part 5 connecting the exhaust pipe main part 1 and upper end 70 of the exhaust purifying catalyst device 7. In addition, the exhaust pipe introduction part 5 is provided so as to have a space from the upper end face 70a of the upper end 70 of the exhaust purifying catalyst device 7, as well as extend obliquely to the exhaust purifying catalyst device 7 side from the end 12 on the exhaust purifying catalyst device 7 side of the exhaust pipe main part 1 until the outer circumferential end 7a of the exhaust purifying catalyst device 7. According to the present embodiment, the exhaust gas flowing out from the exhaust pipe main part 1 to the exhaust pipe introduction part 5 thereby becomes swirl flow at the exhaust pipe introduction part 5 and flows into the exhaust purifying catalyst device 7. In other words, by causing swirl flow to generated in the flow of exhaust gas, it is possible to sufficiently suppress uneven flow of exhaust gas flowing into the exhaust purifying catalyst device 7. For this reason, since it is possible to lead the exhaust gas to the exhaust purifying catalyst device 7 with good balance, it is possible to make uniform and optimize the exhaust gas exposure to the exhaust purifying catalyst supported on the exhaust purifying catalyst section 71, and thus possible to rapidly raise the temperature of the exhaust purifying catalyst. In addition, according to the exhaust pipe structure 10 of the present embodiment, it is possible to make the length of the exhaust pipe main part 1 shorter than conventional, and thus it is possible to realize optimization of the exhaust gas exposure to the exhaust purifying catalyst in a shorter distance than conventional. Therefore, it is possible to achieve space savings with a smaller exhaust pipe structure 10 than conventional, and possible to reduce the heat capacity of the exhaust pipe main part 1, and thus the exhaust purifying catalyst can be raise in temperature more rapidly.

In addition, with the present embodiment, the detection element 91 of the exhaust sensor 9 is arranged in the vicinity of a boundary between the exhaust pipe main part 1 and exhaust pipe introduction part 5. As mentioned above, the exhaust gas flowing out from the exhaust pipe main part 1 to the exhaust pipe introduction part 5 becomes swirl flow. For this reason, by arranging the detection element 91 of the exhaust sensor 9 in the vicinity of a boundary between the exhaust pipe main part 1 and exhaust pipe introduction part 5 serving as the starting point of swirl flow, it is possible to capture the main flow of exhaust gas prior to the exhaust gas becoming swirl flow and diffusing, and thus possible to improve the detection precision of the exhaust sensor 9.

In addition, with the present embodiment, the exhaust pipe introduction part 5 connecting the exhaust pipe main part 1 and upper end 70 of the exhaust purifying catalyst device 7 is formed so as to slope to the exhaust purifying catalyst device 7 side in a spiral shape along the circumferential direction thereof from the end 12 on the exhaust purifying catalyst device 7 side (downstream side) of the exhaust pipe main part 1. According to the present embodiment, since it is thereby possible to more reliably cause swirl flow to generate in the flow of exhaust gas, the aforementioned effects are more reliably exerted.

It should be noted that the present invention is not to be limited to the above-mentioned embodiment, and that modifications, improvements, etc. of a scope that can achieve the object of the present invention are also included in the present invention. For example, in the above-mentioned embodiment, the exhaust pipe structure of the present invention is applied to the exhaust system of a diesel engine; however, it is not limited thereto, and may be applied to the exhaust system of a gasoline engine. In addition, in the above-mentioned embodiment, the exhaust pipe main part and exhaust pipe introduction part are configured to be integrated; however, it is not limited thereto. This exhaust pipe main part and exhaust pipe introduction part may be configured as separate parts. In addition, in the above-mentioned embodiment, the LAF sensor is provided to the top of the exhaust pipe main part; however, it is not limited thereto. An $O_2$ sensor, A/F sensor, NOx sensor or the like may be provided in place of the LAF sensor.

EXPLANATION OF REFERENCE NUMERALS

1 exhaust pipe main part
2 engine (internal combustion engine)
3 turbocharger
5 exhaust pipe introduction part
7 exhaust purifying catalyst device
7*a* outer circumferential end
9 exhaust sensor
10 exhaust pipe structure
11 exhaust inlet
12 end on exhaust purifying catalyst device side

50 boundary
70 upper end (one end)
70*a* upper end face (end face of one end)
91 detection element
E engine room
C1 center of exhaust inlet
X center axis line

The invention claimed is:

1. An exhaust pipe structure for an internal combustion engine in which a tubular exhaust purifying catalyst device including an exhaust purifying catalyst is disposed in a vicinity of the internal combustion engine within an engine room, the exhaust pipe structure comprising:

an exhaust pipe main part which curves from a side of the internal combustion engine and extends towards an end of the exhaust purifying catalyst device in a center axis line direction of the exhaust purifying catalyst device; and an exhaust pipe introduction part that connects the exhaust pipe main part and the end of the exhaust purifying catalyst device, and introduces exhaust gas from the exhaust pipe main part into the exhaust purifying catalyst device, wherein the exhaust pipe main part is disposed so that a center of an exhaust inlet on the side of the internal combustion engine is offset from the center axis line of the exhaust purifying catalyst device when viewed from a side of the exhaust inlet, and an end of the exhaust pipe main part on a side of the exhaust purifying catalyst device is connected to an outer circumferential side of the exhaust pipe introduction part, wherein the exhaust pipe introduction part has a space from an end face of the end of the exhaust purifying catalyst device, and extends obliquely to the side of the exhaust purifying catalyst device from the end of the exhaust pipe main part on the side of the exhaust purifying catalyst device until an outer circumferential end of the exhaust purifying catalyst device, wherein the exhaust pipe introduction part extends obliquely to the side of the exhaust purifying catalyst device in a spiral shape, from one outer circumferential side at which the end of the exhaust pipe main part on the side of the exhaust purifying catalyst device is connected towards another outer circumferential side thereof opposing the one outer circumferential side along a circumferential direction thereof, and there arranged a detection element of an exhaust sensor at a boundary area between the exhaust pipe main part and the exhaust pipe introduction part, and wherein an end of the detection element of the exhaust sensor is located at a starting point of the swirl flow generated in the exhaust introduction part.

2. The exhaust pipe structure for an internal combustion engine according to claim 1, wherein an end of the exhaust pipe introduction part on the side of the exhaust purifying catalyst device, by being connected to an outer circumferential side of the exhaust purifying catalyst device, is disposed more outwards than an outer circumferential end of an exhaust purifying catalyst section constituting the exhaust purifying catalyst device.

* * * * *